United States Patent [19]

Lee

[11] Patent Number: 5,094,680
[45] Date of Patent: Mar. 10, 1992

[54] ZEOLITE-ACTIVATED GUANO PHOSPHATES AND A METHOD FOR PRODUCING THE SAME

[76] Inventor: Chiang H. Lee, No. 50, Lane 81, Lite 11 Rd., Tainan, Taiwan

[21] Appl. No.: 680,066

[22] Filed: Apr. 3, 1991

[51] Int. Cl.⁵ .................. C05B 13/02; C05F 3/02; C05G 3/00
[52] U.S. Cl. .................. 71/33; 71/52; 71/62; 71/63; 71/64.04; 423/167
[58] Field of Search .................. 71/31, 63, 64.01, 33, 71/52, 64.04, 62; 423/321 R, 320, 167, 173, 308, 311

[56] References Cited

U.S. PATENT DOCUMENTS

| | | | |
|---|---|---|---|
| 4,013,443 | 3/1977 | Schuman | 71/31 |
| 4,238,459 | 12/1980 | Phillips, Jr. et al. | 423/167 |
| 4,906,444 | 3/1990 | Ohtsuka et al. | 423/308 |

Primary Examiner—Ferris Lander
Attorney, Agent, or Firm—Staas & Halsey

[57] ABSTRACT

Zeolite-activated guano phosphate fertilizers are produced by a method comprising grinding guano phosphates to 10 mesh granules by roughing and middling mills, heating in a rotary kiln, cooling, finely grinding to obtain 100 mesh guano phosphate powder, analyzing the content of the phosphoric anhydride in the powder, and mixing with natural zeolites to obtain zeolite-activated guano phosphates, wherein the proportion of the phosphoric anhydride is controlled at 18% by weight.

2 Claims, 2 Drawing Sheets

ZEOLITE-ACTIVATED GUANO PHOSPHATES AND A METHOD FOR PRODUCING THE SAME

BACKGROUND OF THE INVENTION

The present invention relates to zeolite-activated guano phosphates and to methods for producing the same.

In recent years, soils around the world have been acidified and hardened because of the use of chemical fertilizers, thereby causing the loss of nutriment in the soils and lowering the productivity of plants.

Conventional chemical phosphate fertilizers are produced from phosphate-containing minerals which are usually hard and contain 4% to 6% fluorine by weight. The method to produce these fertilizers is to treat the phosphate-containing minerals with sulfuric acid and/or nitric acid, thereby causing the decomposition of the minerals therein. The reaction of the conventional process for producing phosphate fertilizers is as follows:

$$Ca_3(PO_4)_2 + H_2SO_4 + 6H_2O \rightarrow 2(CaHPO_4.2H_2O) + CaSO_4.2H_2O$$

wherein the accompanying $CaSO_4$ will acidify and harden soil. Since the previous reaction is a chemical reaction, the $CaSO_4$ will be inseparable with the $CaHPO_4.2H_2O$. Thus, the molecular weight percentage of the phosphoric anhydride is:

$$\frac{P_2O_5}{2(CaHPO_4 \cdot H_2O) + CaSO_4 \cdot 2H_2O} * 100 =$$

$$\frac{(30.97 * 2 + 16 * 5)}{2 * (40 + 1 + 30.97 + 16 * 4 + 2 * (1 * 2 + 16) + 40 + 32 + 16 * 4 + 2(1 * 2 + 16))} *$$

$$100 = 27.5\%$$

The molecular weight percentage of the phosphoric anhydride in $Ca_3(PO_4)_2$ of the phosphate-containing minerals is:

$$\frac{P_2O_5}{Ca_3(PO_4)_2} * 100 =$$

$$\frac{(30.97 * 2 + 16 * 5)}{40 * 3 + (30.97 + 16 * 4) * 2} \times 100 = 45.8\%$$

Thus, the lowest possible weight percentage of the phosphoric anhydride in the phosphate fertilizers produced from the phosphate-containing minerals is:

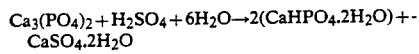

$$\frac{30 \text{ (the lowest content of phosphoric anhydride in the phosphate-containing minerals)} * 27.5\%}{45.8\%} = 18.01$$

This content is essentially the same as the standard content of phosphoric anhydride required in the phosphate fertilizers. But in general, the chemical reaction being carried out rarely reaches 100%. Thus, to maintain the proportion of the phosphoric anhydride in the phosphorus-containing fertilizers at 18% by weight, it is necessary to select phosphate-containing minerals that contain more than 34% phosphorus by weight before proceeding with chemical treatments, thereby causing an increase in cost.

It is the purpose of this present invention, therefore, to mitigate and/or obviate the abovementioned drawbacks in the manner set forth in the detailed description of the preferred embodiment.

SUMMARY OF THE INVENTION

The present invention employs guano phosphates which contain merely about 0.22% fluorine by weight and are primarily composed of calcium phosphate ($Ca_3(PO_4)_2$, $Ca_2HPO_4$, and $CaH_2PO_4$). In addition, guano phosphates are the main source of phosphoric anhydride and calcium oxide, and are abundant in numerous minerals being beneficial to plant growth and soil amendments, such as ferric oxide ($Fe_2O_3$), sodium oxide ($Na_2O$), potassium oxide ($K_2O$), magnesium oxide ($MgO$), copper oxide ($CuO$), zinc oxide ($ZnO$), manganese oxide ($MnO$), molybdenum oxide ($MoO$), etc. These minerals neutralize soil and have ion-exchange properties, and they can also aggregate soil to a suitable granular size, so that the soils have good air permeabilities, thereby retaining soil fertility.

Also employed in this invention is natural zeolite, particularly chabazite whose formula is $Na_{10}CaAl_{12}Si_{2-4}O_{72}.40H_2O$, which has ion-exchange and absorption properties and can raise the pH of acidic volcanic soils. Their flat-flying nature and closeness to the surface suggest a large supply of inexpensive zeolites.

It is an object of the present invention to provide zeolite-activated guano phosphates which possess enduring fertility, neutralization capabilities for acidified soils, and reproducibility properties.

It is another object of the present invention to provide a method for producing said zeolite-activated guano phosphates.

These and additional objects, if not set forth specifically herein, will be readily apparent to those skilled in the art from the detailed description provided hereunder, with appropriate reference to the accompanying drawings.

DETAILED DESCRIPTION OF THE PREFERRED EMBODIMENTS

Figure 1:
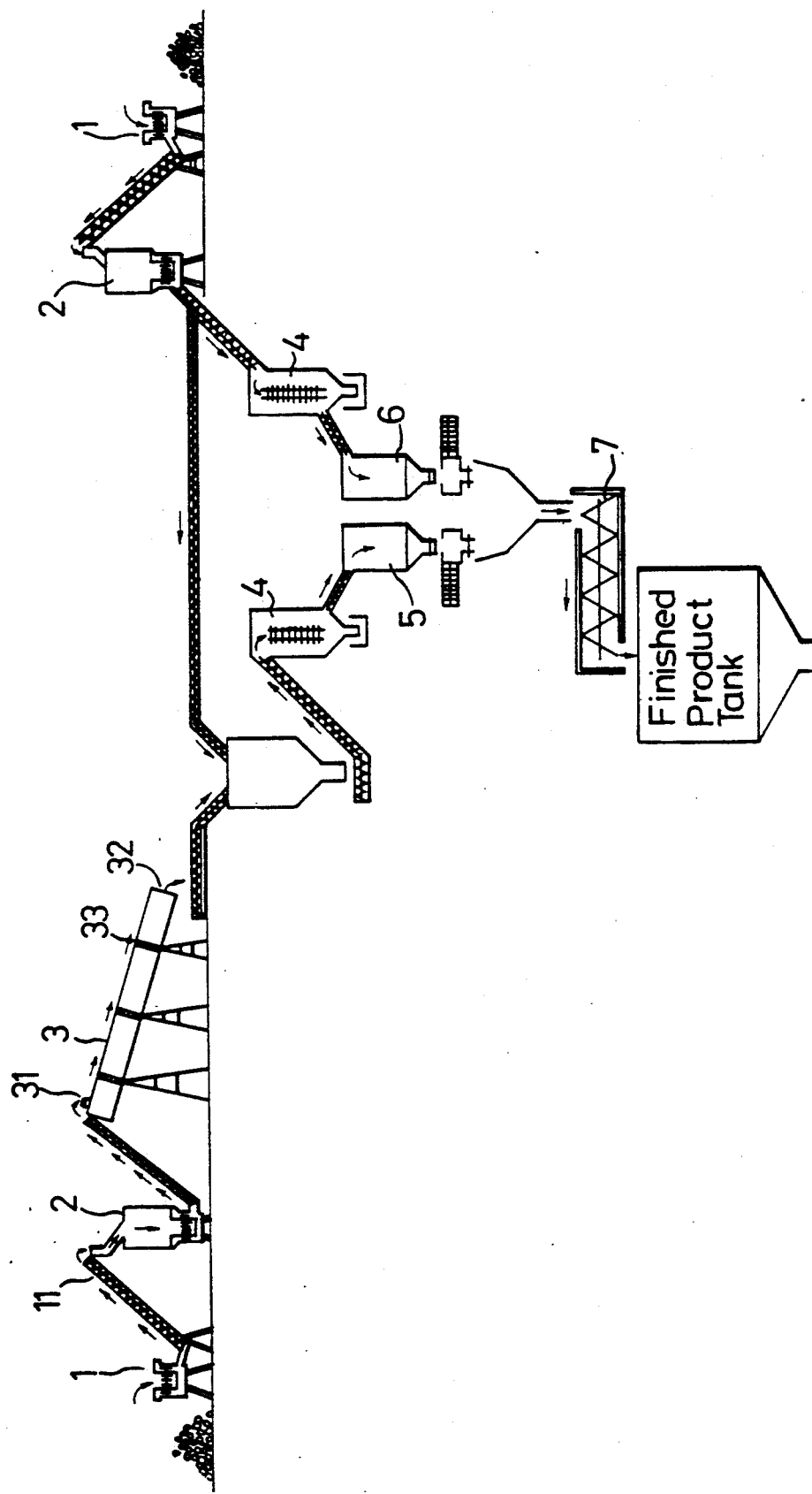
FIG. 1 is a diagrammatic illustration for producing zeolite-activated guano phosphates in accordance with the present invention.
Figure 2:
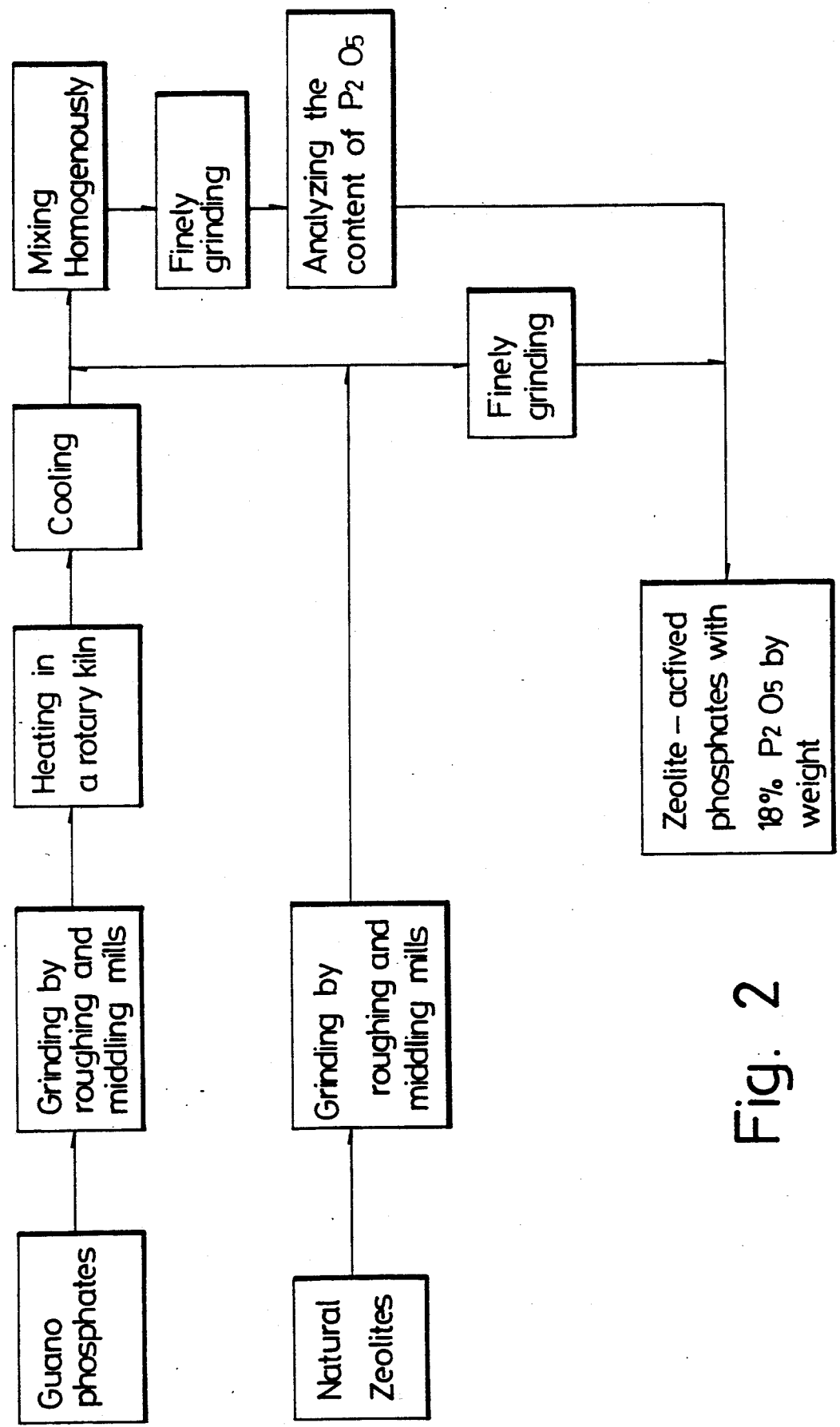
FIG. 2 is a flow diagram showing in schematic form the process involves in the present invention.

Referring to FIG. 1, natural zeolites are ground into granules by a roughing mill 1 and middling mill 2. Lumps of guano phosphates are put into a roughing mill 1 to be ground into granular lumps, conveyed to a middling mill 2 by a conveyer 11 to be ground into about 10 mesh granules, and conveyed to a rotary kiln 3 by a conveyer. The rotary kiln 3, whose diameter is one meter and length is about 20 meters, is set inclined to the ground and has an inlet 31 on an upper part thereof and an outlet 32 on a lower part thereof. Numerous ring rotary kiln 3, can be assembled with a transmission to rotate the rotary kiln 3. The rotary kiln 3 comprises two coaxial tubes, wherein the space between the outer and inner tubes is used as a combustion chamber. The granular guano phosphates from middling mill 2 is conveyed to the inner tube of the rotary kiln 3. The granular guano phosphates are activated (i.e. to possess enduring fertility and reproducibility) by being rotated and steadily heated to about 700°–800° C. in the rotary kiln 3; allowed to cool to about 300° C.; mixed homogenously with natural zeolite granules from middling mill 2; conveyed to a fine mill 4 to be ground into about 100 mesh powder; and then conveyed to a storage tank 5. On the other hand, natural zeolites are ground into powder and conveyed to a storage tank 6. The phosphoric anhydride-containing powder in the store tank 5 is analyzed and then mixed with the zeolite powder to form zeoliteguano phosphate mixture, wherein the proportion of the phosphoric anhydride is controlled at 18% by weight. The mixture is directed to a mixing agitator 7 and then directed to a finished product tank. Thus, a product of formula $Ca_3(PO_4)_2$.zeolite which contains 18% by weight phosphoric anhydride is obtained.

Guano phosphates have the lowest content of fluorine among the phosphate-containing minerals, and are abundant in minerals. The product of the present invention is produced by grinding guano phosphates, heating in a rotary kiln, cooling, and mixing with natural zeolites powder to form zeolite-actived guano phosphates, which are found as excellent fertilizers.

The molecular weight percentage of the phosphoric anhydride in the $CaHPO_4.2H_2O$ is:

$$\frac{P_2O_5}{2(CaHPO_4.2H_2O)} * 100 =$$

$$\frac{(30.97 * 2 + 16 * 5)}{2 * (40 + 1 + 30.97 + 16 * 4 + 2 * (1 * 2 + 16))} * 100 = 41.3\%$$

The molecular weight percentage of the phosphoric anhydride in the $Ca_3(PO_4)_2$ of guano phosphates is:

$$\frac{P_2O_5}{Ca_3(PO_4)_2} * 100 =$$

$$\frac{(30.97 * 2 + 16 * 5)}{40 * 3 + (30.97 + 16 * 4) * 2} * 100 = 45.8\%.$$

The weight percentage of the phosphoric anhydride in the phosphate fertilizers produced in accordance with the present invention is:

$$\frac{27 \text{ (the content of phosphoric anhydride in the guano phosphates)} * 41.3\%}{45.8\%} = 24.3$$

Thus, the product can be analyzed and then mixed with natural zeolites so as to obtain a product containing 18% by weight of phosphoric anhydride.

When the product of the present invention fertilizes the soil and reacts with the water contained in the soil, the zeolite will adsorb calcium oxide (CaO) so as to to prevent the reaction of CaO and the produced $CaHPO_4.2H_2O$, thereby stabilizing the fertilizer $CaHPO_4.2H_2O$. The reactions are as follows:

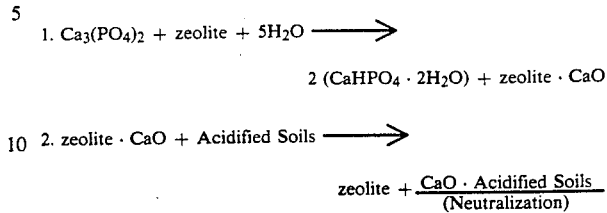

wherein $CaHPO_4.2H_2O$ is an excellent fertilizer and zeolite.CaO can neutralize acidified soils. In addition, the presence of zeolite.CaO is not harmful to soils which are not acidified.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A method for producing zeolite-activated guano phosphates comprising the steps of:
   grinding guano phosphates by roughing and middling mills;
   grinding natural zeolites using different roughing and middling mills;
   conveying the ground guano phosphates to an inner tube of a rotary kiln to heat the ground guano phosphates to 700°–800° C.;
   cooling the ground guano phosphates to about 300° C.;
   mixing the cooled ground guano phosphates with ground natural zeolites to form a mixture;
   finely grinding natural zeolites into a zeolite power;
   finely grinding the mixture to obtain about 100 mesh guano phosphate powder;
   analyzing phosphoric anhydride in the guano phosphate powder; and
   mixing the guano phosphate powder and the zeolite powder to obtain a zeolite-activated guano phosphates mixture having a weight percentage of the phosphoric anhydride controlled at 18%.

2. A method for producing zeolite-activated guano phosphate according to the method of claim 1 further comprising the step of:
   agitating the zeolite-activated guano phosphates mixture to be stored in a finished product tank.

* * * * *